(12) United States Patent
Jones et al.

(10) Patent No.: US 10,747,729 B2
(45) Date of Patent: Aug. 18, 2020

(54) DEVICE SPECIFIC CHUNKED HASH SIZE TUNING

(71) Applicant: MICROSOFT TECHNOLOGY LICENSING, LLC, Redmond, WA (US)

(72) Inventors: Brian D. Jones, Woodinville, WA (US); Julian Burger, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 15/694,744

(22) Filed: Sep. 1, 2017

(65) Prior Publication Data

US 2019/0073376 A1 Mar. 7, 2019

(51) Int. Cl.
*G06F 16/00* (2019.01)
*G06F 16/178* (2019.01)
*G06F 16/13* (2019.01)
*G06F 16/182* (2019.01)

(52) U.S. Cl.
CPC .......... *G06F 16/178* (2019.01); *G06F 16/137* (2019.01); *G06F 16/1844* (2019.01)

(58) Field of Classification Search
None
See application file for complete search history.

(56) References Cited

U.S. PATENT DOCUMENTS

| 5,797,004 | A  | * | 8/1998  | Lindholm ............... G06F 9/52 718/102 |
|---|---|---|---|---|
| 8,272,060 | B2 |   | 9/2012  | Milliken et al. |
| 8,312,250 | B2 |   | 11/2012 | Forhan et al. |
| 8,639,669 | B1 | * | 1/2014  | Douglis ............... G06F 3/0641 707/692 |
| 8,712,963 | B1 | * | 4/2014  | Douglis ............. G06F 11/2094 707/625 |
| 9,182,923 | B2 |   | 11/2015 | Skowron et al. |
| 9,244,937 | B2 |   | 1/2016  | Akirav et al. |
| 9,311,323 | B2 |   | 4/2016  | Chakraborty et al. |
| 9,436,596 | B2 |   | 9/2016  | Sengupta et al. |
| 9,503,123 | B1 | * | 11/2016 | Pinho ....................... G06N 5/04 |
| 10,380,074 | B1 | * | 8/2019 | Gu ....................... G06F 16/1752 |
| 2010/0185703 | A1 |   | 7/2010 | Ylonen |
| 2012/0036366 | A1 |   | 2/2012 | May et al. |

(Continued)

FOREIGN PATENT DOCUMENTS

WO 2016122644 A1 8/2016

*Primary Examiner* — Bai D Vu
(74) *Attorney, Agent, or Firm* — Michael Best & Friedrich LLP

(57) ABSTRACT

Device-specific chunked hash size tuning to maximize synchronization throughput is described. A synchronization client application or similar program may employ hashing to detect changes to content of remotely stored files and synchronize those (as opposed to synchronizing all files, for example). Instead of using static hash chunk sizes for all client applications of a cloud storage service, the synchronization client application may determine the size of hash buffer by baselining throughput of hashing on each synchronization device and finding the number of bytes hashed in a given amount of time. Thus, hash chunk size may be optimized on a machine by machine basis.

19 Claims, 8 Drawing Sheets

(56) References Cited

U.S. PATENT DOCUMENTS

| | | | |
|---|---|---|---|
| 2012/0290537 A1* | 11/2012 | Smith | G06F 3/0608 |
| | | | 707/654 |
| 2015/0205816 A1 | 7/2015 | Periyagaram et al. | |
| 2015/0207743 A1* | 7/2015 | Zanger | H04L 67/14 |
| | | | 709/233 |
| 2016/0188589 A1 | 6/2016 | Guilford et al. | |
| 2016/0352795 A1* | 12/2016 | Badulescu | H04W 4/12 |
| 2018/0246950 A1* | 8/2018 | Arye | G06F 16/951 |

\* cited by examiner

DEVICE SPECIFIC CHUNKED HASH SIZE TUNING

BACKGROUND

Increasingly, cloud storage providers are utilized for storing and/or sharing content across multiple clients, where the cloud storage providers have engines that automatically synchronize the content between the clients. A hash function is any function that can be used to map data of arbitrary size to data of fixed size. Hash functions accelerate database lookup by detecting duplicated records in a large file. Hash functions may also be used to detect integrity and/or changes to content of files, such as cloud stored files. Advances in hardware improve computational throughput of hashes. However, having a fixed hash chunk size, as conventional systems use, limits the ability to take advantage of faster processing because it artificially restricts the process to a statically determined lowest common denominator.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to device-specific chunked hash size tuning. In some examples, a hashing parameter, a hardware parameter associated with the computing device, and/or a runtime parameter associated with a computing device may be received and an initial tuning operation performed to determine a hashing chunk size to be used in remote storage synchronization, file backup, file deduplication, or file integrity confirmation. Upon detecting a trigger event for a re-tuning operation such as an expiration of a predefined period, a change in at least one of a hardware environment or a runtime environment of the computing device, or a request from a user associated with the computing device, the re-tuning operation may be performed to determine a new hashing chunk size to be used in subsequent file operations.

These and other features and advantages will be apparent from a reading of the following detailed description and a review of the associated drawings. It is to be understood that both the foregoing general description, and the following detailed description are explanatory and do not restrict aspects as claimed.

DETAILED DESCRIPTION

Figure 1:
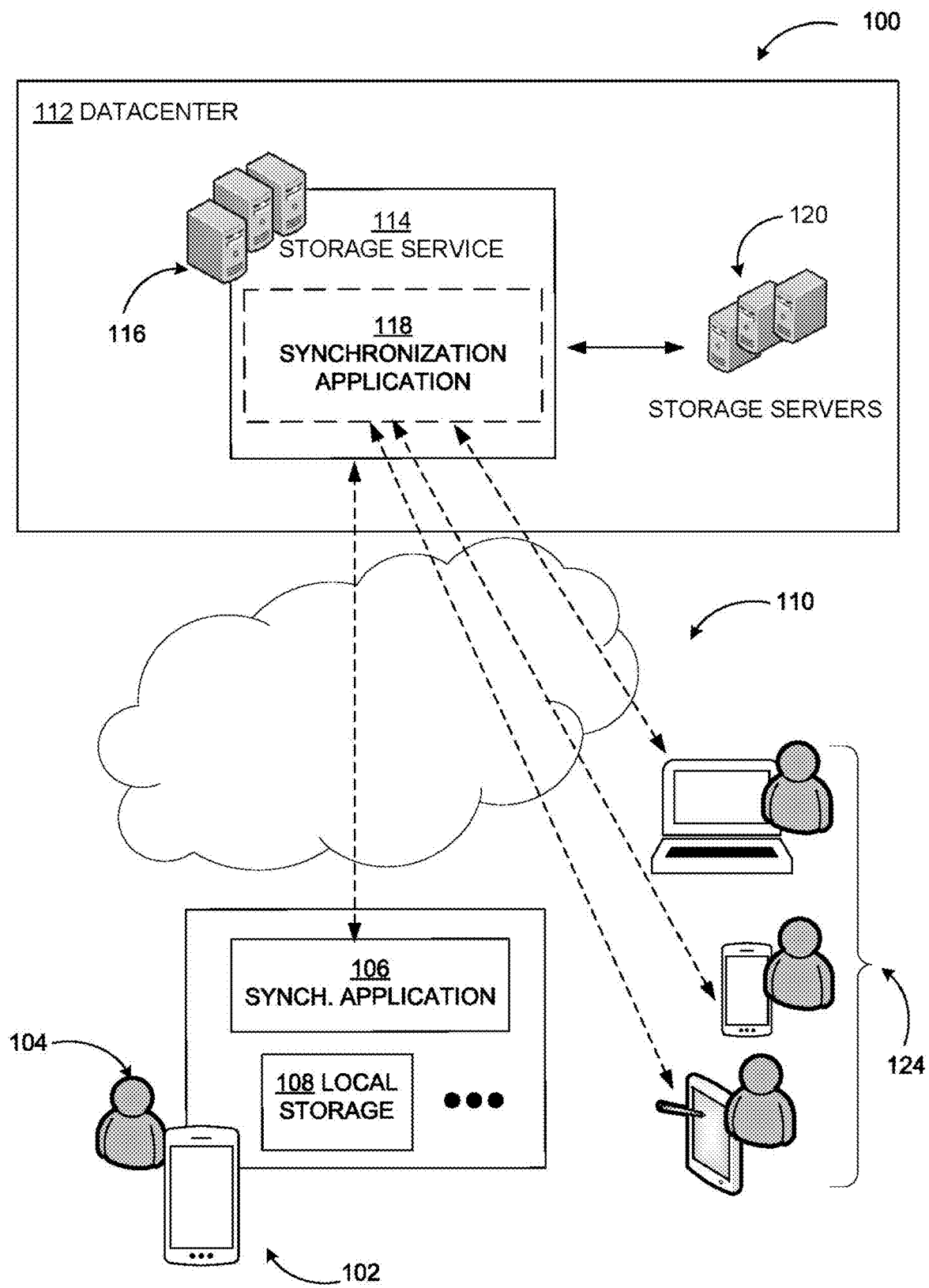
FIG. 1 includes an example network environment where a system to employ device-specific chunked hash size tuning may be implemented.

As briefly described above, embodiments are directed to device-specific chunked hash size tuning to maximize synchronization throughput. A synchronization client application or similar program may employ hashing to detect changes to content of remotely stored files and synchronize those (as opposed to synchronizing all files, for example). Instead of using static hash chunk sizes for all client applications of a cloud storage service, the synchronization client application may determine the size of hash buffer by baselining throughput of hashing on each synchronization device and finding the number of bytes hashed in a given amount of time. Thus, hash chunk size may be optimized on a machine by machine basis.

In the following detailed description, references are made to the accompanying drawings that form a part hereof, and in which are shown by way of illustrations, specific embodiments, or examples. Those aspects may be combined, other aspects may be utilized, and structural changes may be made without departing from the spirit or scope the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for a cloud based storage service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to employ device-specific chunked hash size tuning may be implemented.

Figure 2:
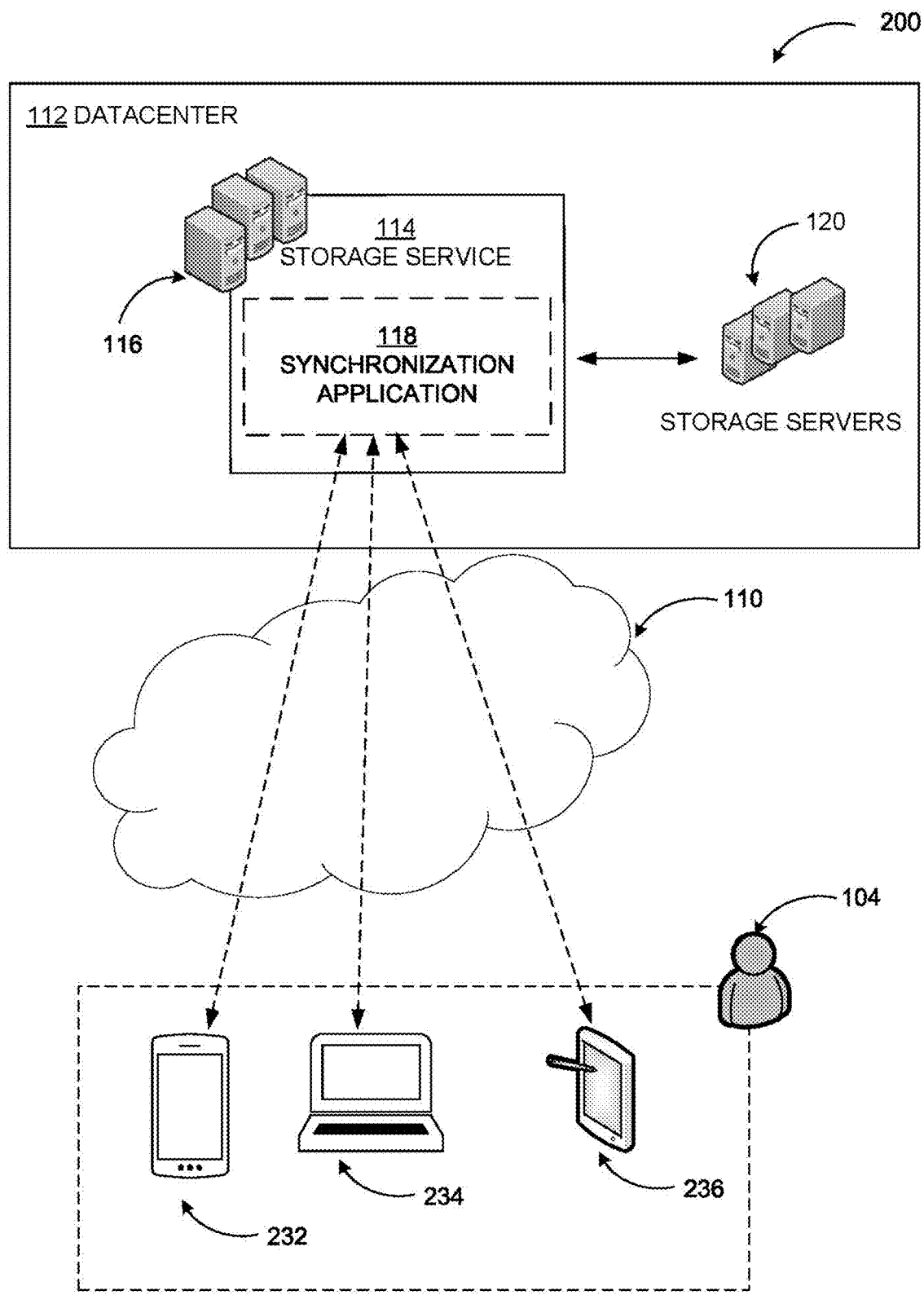
FIG. 2 includes another example network environment where a system to employ device-specific chunked hash size tuning may be implemented.

The example configurations in FIG. 1 and FIG. 2 present a remote storage (cloud-based) service and file synchronization as example environments where device-specific chunked hash size tuning may be implemented. Embodiments are not limited to remote storage file synchronization. Other examples may include, but are not limited to, file backup, file deduplication, or file integrity confirmation.

As illustrated in diagram 100, an example system may include a datacenter 112 hosting a cloud-based storage service 114 configured to provide storage for and enable sharing of content that may be accessed across multiple devices and users. The datacenter 112 may include one or more processing servers 116 configured to execute the storage service 114, among other components. In some embodiments, at least one of the processing servers 116 may be operable to execute a synchronization application 118 of the storage service 114 where the synchronization application 118 may be integrated with the storage service 114 to provide synchronization of remotely and locally stored files on client devices such as device 102 associated with user 104 or other users' devices 124. In other embodiments, the synchronization function and other functions offered by the storage service may be inherently present within the storage service 114 itself. The datacenter 112 may also include one or more storage servers 120 configured to manage one or more data stores comprising data associated with content retained by the storage service 114. As described herein, the storage service 114 and/or synchronization application 118 may be implemented as software, hardware, or combinations thereof.

In some embodiments, the storage service 114 may be configured to interoperate with various applications to synchronize files stored locally on user associated devices with the same files stored remotely at the storage service 114. For example, as illustrated in the diagram 100, a user 104 may execute a thin (e.g., a web browser) or a thick (e.g., a locally installed client application) version of a synchronization application 106 through the device 102 with which the storage service 114 may be configured to integrate and interoperate with over one or more networks, such as network 110. The application 106 may be an application hosted by the storage service, such as a synchronization client, for example. The device 102 may include a desktop computer, a laptop computer, a tablet computer, a vehicle mount computer, a smart phone, or a wearable computing device, among other similar devices. A communication interface may facilitate communication between the storage service 114 and the application 106 over the network 110.

In an example embodiment, the storage service 114 may be configured to receive content stored on local storage 108 of the device 102. The received content may be stored remotely at the storage service 114 within the storage servers 120, for example. Periodic synchronization between the content stored on local storage 108 of the device 102 (and devices 124) and the content stored remotely at the storage service 114 may be performed to ensure a most updated version of the content is stored and/or shared at each location.

In some examples, a hashing parameter, a hardware parameter associated with the computing device, and/or a runtime parameter associated with a computing device may be received and an initial tuning operation performed to determine a hashing chunk size to be used in remote storage synchronization, file backup, file deduplication, or file integrity confirmation. Upon detecting a trigger event for a re-tuning operation such as an expiration of a predefined period, a change in at least one of a hardware environment or a runtime environment of the computing device, or a request from a user associated with the computing device, the re-tuning operation may be performed to determine a new hashing chunk size to be used in subsequent file operations.

FIG. 2 includes another example network environment where a system to employ device-specific chunked hash size tuning may be implemented.

Elements in diagram 200 indicated by same reference numerals as in diagram 100 may be configured to function similarly. The example environment in FIG. 2 is similar to that in FIG. 1. Differently from FIG. 1, in FIG. 2, the storage service 114 is shown interacting with multiple client devices of user 104 such as smart phone 232, desktop computer 234, and tablet computer 236. Hashing chunk size tuning according to embodiments may be device-specific based on hardware and operating system environments of the individual client devices. However, there may be circumstances, where a user may wish to use the same hashing chunk size for multiple client devices. For example, similar computing devices (e.g., desktop computers) may be configured to use the same hashing chunk size and similar hashing algorithms. In such scenarios, a user (e.g., an administrator) may be presented with an option to configure a client device as a master device among multiple client devices and the hashing chunk size may be set for remaining client devices of the user based on the initially (or subsequently) determined hashing chunk size.

Some of the actions and/or processes described herein have been illustrated from the perspective of a client device (for example, the device 102, however the same actions may be performed similarly by a server (for example, a server that itself is a client of the storage service 114), among other entities. Additionally, some of the actions and/or processes described herein have been illustrated from the perspective of a server of the storage service, however the same actions may be performed similarly by the client device.

Conventionally, cloud-based storage services and/or providers use static hashing chunk size resulting in inefficiencies for client devices whose hardware or operating system environments may not be ideal for the selected chunk size. By employing device-specific chunked hash size tuning to maximize synchronization throughput, network bandwidth usage, processing capacity consumption, memory usage, and local and/or remote storage consumption may be reduced. User experience with cloud based storage services may be enhanced.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 3:
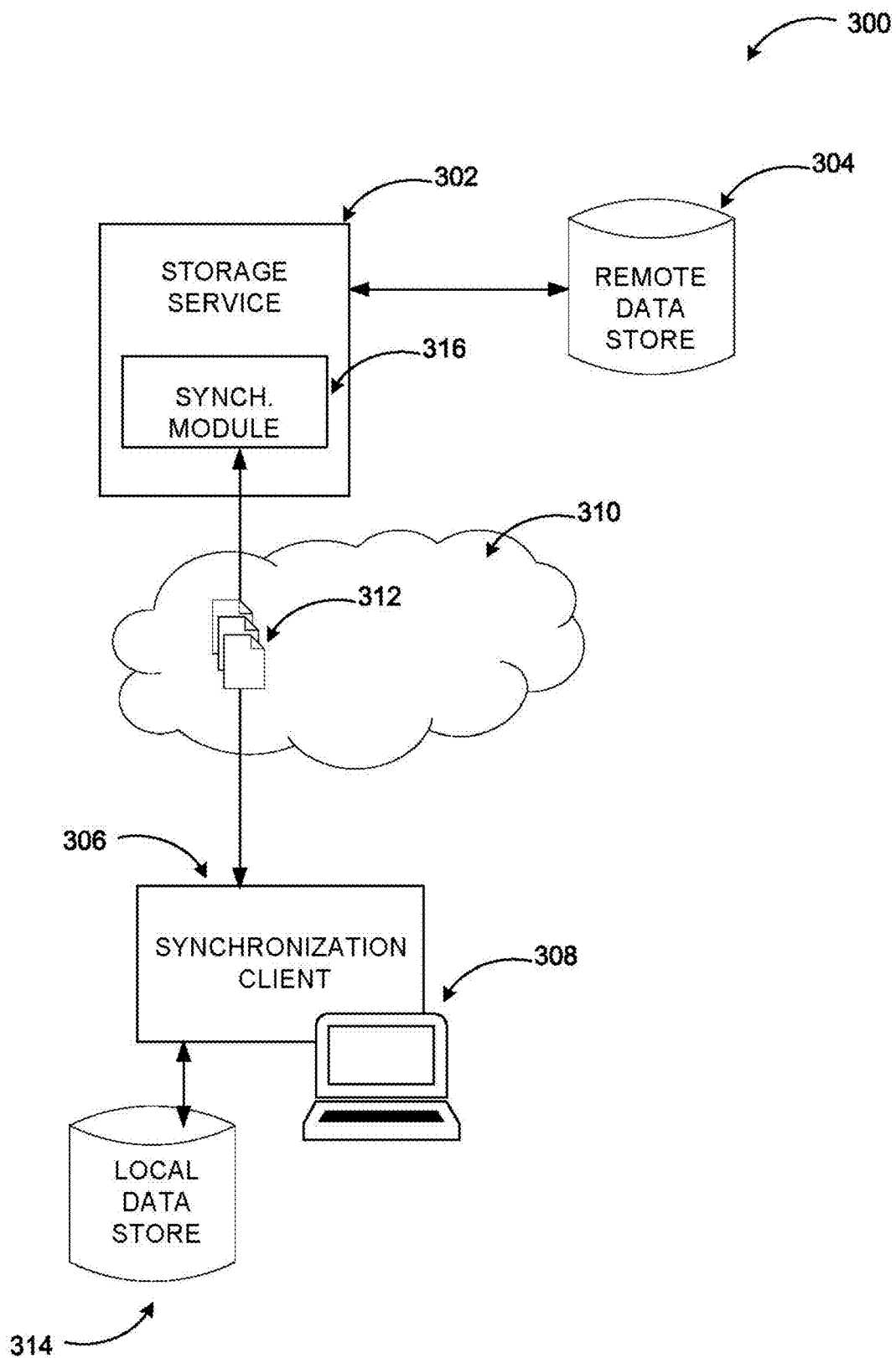
FIG. 3 illustrates conceptually a synchronization process with a cloud based storage service using device-specific chunked hash size tuning.

FIG. 3 illustrates conceptually a synchronization process with a cloud based storage service using device-specific chunked hash size tuning.

As shown in diagram 300, a storage service 302 may provide cloud storage services at a remote data store 304 to users for data on their computing devices. Local copies of the files may be provided through local data store 314 to allow a user fast access to the data through their computing device 308. To avoid having to synchronize all files and consuming unnecessary bandwidth and processing resources, the storage service 302 may synchronize only files 312 whose content have changed through interactions between synchronization module 316 and synchronization client 306 over networks 310. Files whose content has changed may be determined through a hashing algorithm executed at the computing device 308. As discussed previously, the chunk size for hashing may determine consumption of computing resources such as processors, memory, etc.

Instead of using a statically determined and uniform chunk size regardless of specific environment parameters for the computing device 308, a device-specific chunk size may be employed and the chunk size re-determined (re-tuned) in response to changes in the hardware or operating system environments of the computing device 308. For example, a hardware degradation or a hardware upgrade, a hardware configuration change controlled by the operating system, an operating system update, a device driver change or update, a third-party software change or update, or a system service change may trigger re-tuning of the hashing chunk size. As mentioned above, hashing chunk size timing may be implemented for purposes other than remote storage synchronization too.

Figure 4:
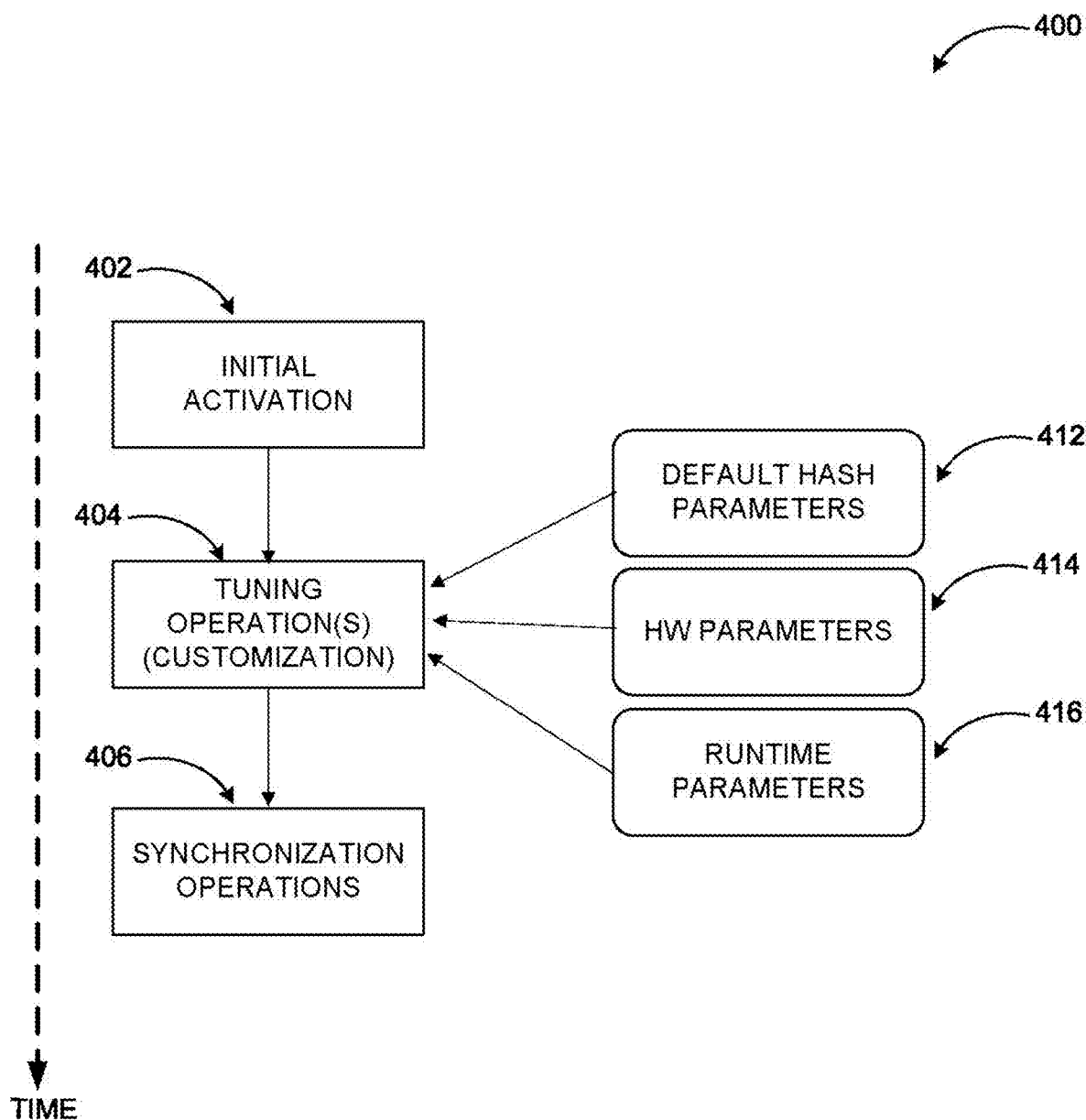
FIG. 4 is a block diagram illustrating an initial tuning or customization process in device-specific chunked hash size tuning.

FIG. 4 is a block diagram illustrating an initial tuning or customization process in device-specific chunked hash size tuning.

Diagram 400 shows an example process of initial tuning. In an example configuration, upon initial activation 402 of a synchronization client application, default hashing parameters 412 (e.g., initial chunk size), hardware parameters 414, and/or operating system parameters 416 may be received and used in performing the initial tuning (or customization) operations 404. The determined hashing chunk size may then be used in synchronization operations 406.

In some embodiments, an initial tuning operation to determine a hashing chunk size may be performed. The hashing chunk size may be used in remote storage synchronization, file backup, file deduplication, or file integrity confirmation. A hashing parameter, a hardware parameter associated with the computing device, or a runtime parameter associated with the computing device may be received and used in the initial tuning operation. For example, the hardware parameter may include an overall processor capacity, an available processor capacity, an overall memory, or an available memory, and the runtime parameter may include a memory usage configuration or a processor queue configuration. While the initial hashing chunk size is used, a trigger event for a re-tuning operation may be detected.

The trigger event may include an expiration of a predefined period, a change in at least one of a hardware environment or a runtime environment of the computing device, and/or a request from a user associated with the computing device. Upon detection of the trigger event, the re-tuning operation may be performed to determine a new hashing chunk size to be used in subsequent operations. The change in the hardware environment may include, for example, a hardware degradation or a hardware upgrade. In some examples, a passive detection of system degradation may be employed. For example, speed of chunk hashing may be monitored and a slowing may be interpreted as system degradation and need to re-tune the chunk size. The change in the runtime environment may include a hardware configuration change controlled by the operating system, an operating system update, a device driver change or update, a third-party software change or update, or a system service change.

In other embodiments, the hashing parameter received initially may include a default hashing chunk size from a remote storage service and that hashing chunk size may be used as initial hashing chunk size. The initial tuning operation may be performed at an installation of a synchronization client application, a start-up of the synchronization client application, or a remote storage service account activation. The initial tuning operation may include a test to determine a number of bytes that can be hashed in a predefined period of time based on a hardware environment and a runtime environment of the computing device. A test buffer may be set with a predefined set of byte values or a randomly generated set of byte values.

Various approached may be employed in determining the chunk size. In one example, a largest reasonably sized static buffer may be created and hashed until the entire contents of the buffer are hashed or a time limit is reached. If hashing completes early, the largest size allowed may be used as the hashing chunk size. Otherwise, a scaled chunk size value may be determined based on number of bytes that were hashed. The latter chunk size may be linearly sealed by time. In another example, a static buffer may be created based on a lowest common denominator (e.g., 1 MB) and repeatedly hashed until a test period expires. After the test period has expired, the number of full buffers that have been hashed may be determined and multiplied by the size of the buffer to determine the hashing chunk size. If no full buffers were hashed, a chunk size equal to the lowest common denominator may be used.

In a further example, bytes may be continuously fed into the used hash algorithm until the test period expires. The total number of bytes hashed may be used as the chunk size. In yet another example, several statically sized buffers may be hashed until one whose hash time matches the time limit is found. The size of the buffer that most closely matches the desired time period without exceeding it may be selected as the hashing chunk size. Similarly, a binary search algorithm (or comparable one) may be used to iterate through various buffer sizes until one that best fits the time limit is found.

In other embodiments, upon determination of the hashing chunk size, the determined chunk size may be aligned to known file-system segment sizes. For example, if the file system has a 4 k segment size, the computed chunk size may be rounded down to the closest 4 k boundary. The test methods discussed above may be repeated for each hash algorithm employed by the computing device.

Figure 5:
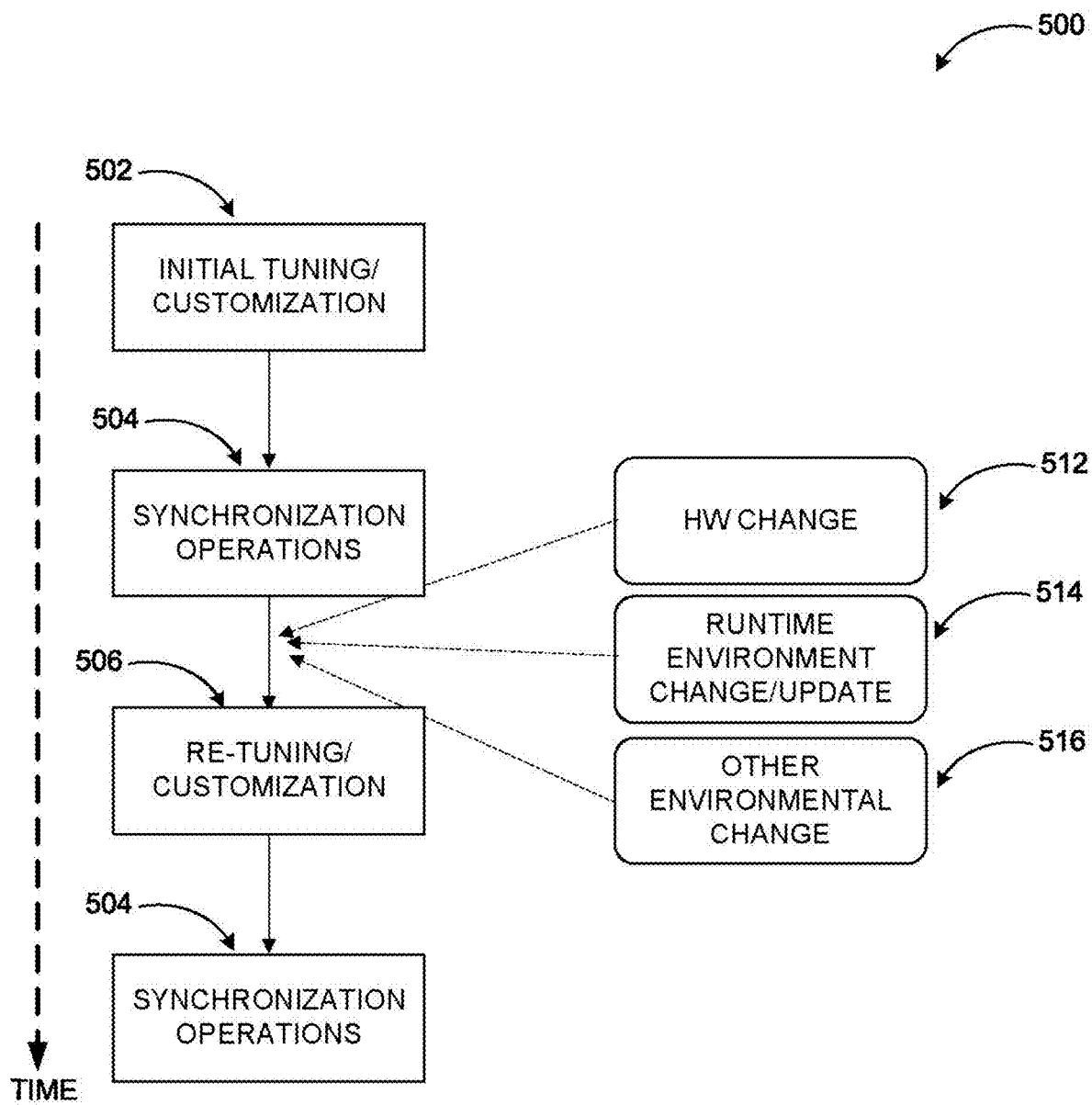
FIG. 5 is a block diagram illustrating repeat timing or customization processes in device-specific chunked hash size tuning.

FIG. 5 is a block diagram illustrating repeal tuning or customization processes in device-specific chunked hash size tuning.

Diagram 500 shows an example configuration for dynamically adjusted hashing chunk size. The initial tuning or customization 502 and use of the determined hashing chunk size in synchronization operations 504 (or other operations) may be as discussed previously. While the initially determined hashing chunk size is in use for synchronization operations, one or more of a hardware environment change 512, a runtime change or update 514, and/or other environmental changes 516 may be detected. Upon detection of the change(s), a re-tuning operation 506 similar to the initial tuning may be performed to determine a new hashing chunk size based on the changed environment. Subsequent synchronization operations 504 may be performed using the new hashing chunk size.

The examples provided in FIGS. 1 through 5 are illustrated with specific systems, services, applications, and modules. Embodiments are not limited to environments according to these examples. Device-specific chunked hash size tuning to maximize synchronization throughput may be implemented in environments employing fewer or additional systems, services, applications, engines, and user experience configurations. Furthermore, the example systems, services, applications, modules, and notifications shown in FIG. 1 through 5 may be implemented in a similar manner with other values using the principles described herein.

Figure 6:
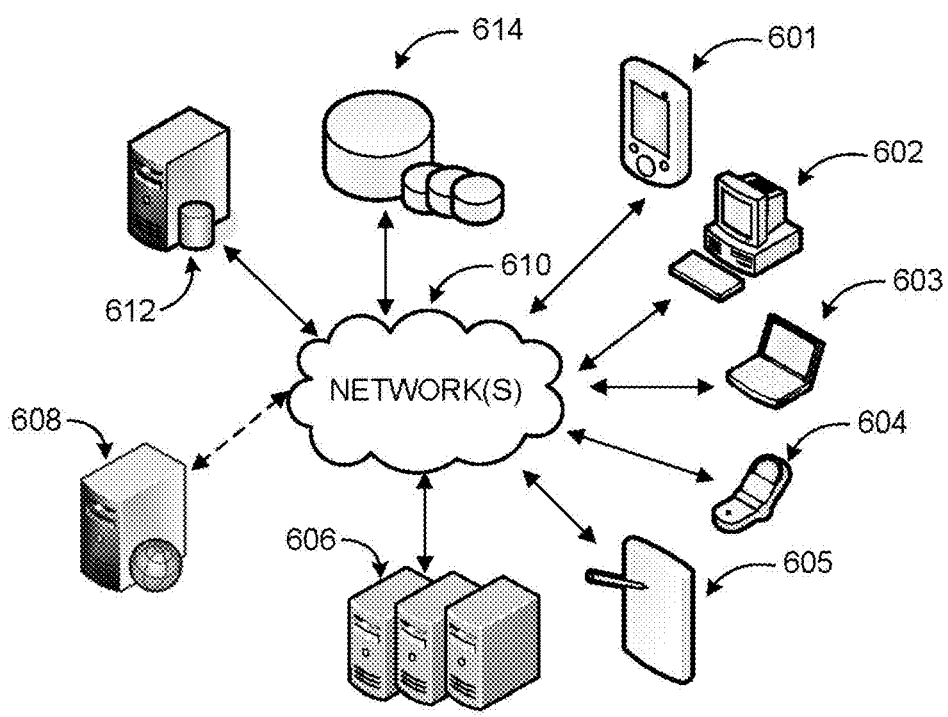
FIG. 6 is a networked environment, where a system according to embodiments may be implemented.

FIG. 6 is a networked environment, where a system according to embodiments may be implemented. Locally installed applications (for example, synchronization application 106) may be employed in conjunction with hosted applications and services (for example, a storage service 114) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network, such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for device-specific chunked hash size tuning to maximize synchronization throughput. Furthermore, the networked environments discussed in FIG. 6 are for illustration purposes only. Embodiments are not limited to the example applications, engines, or processes.

Figure 7:
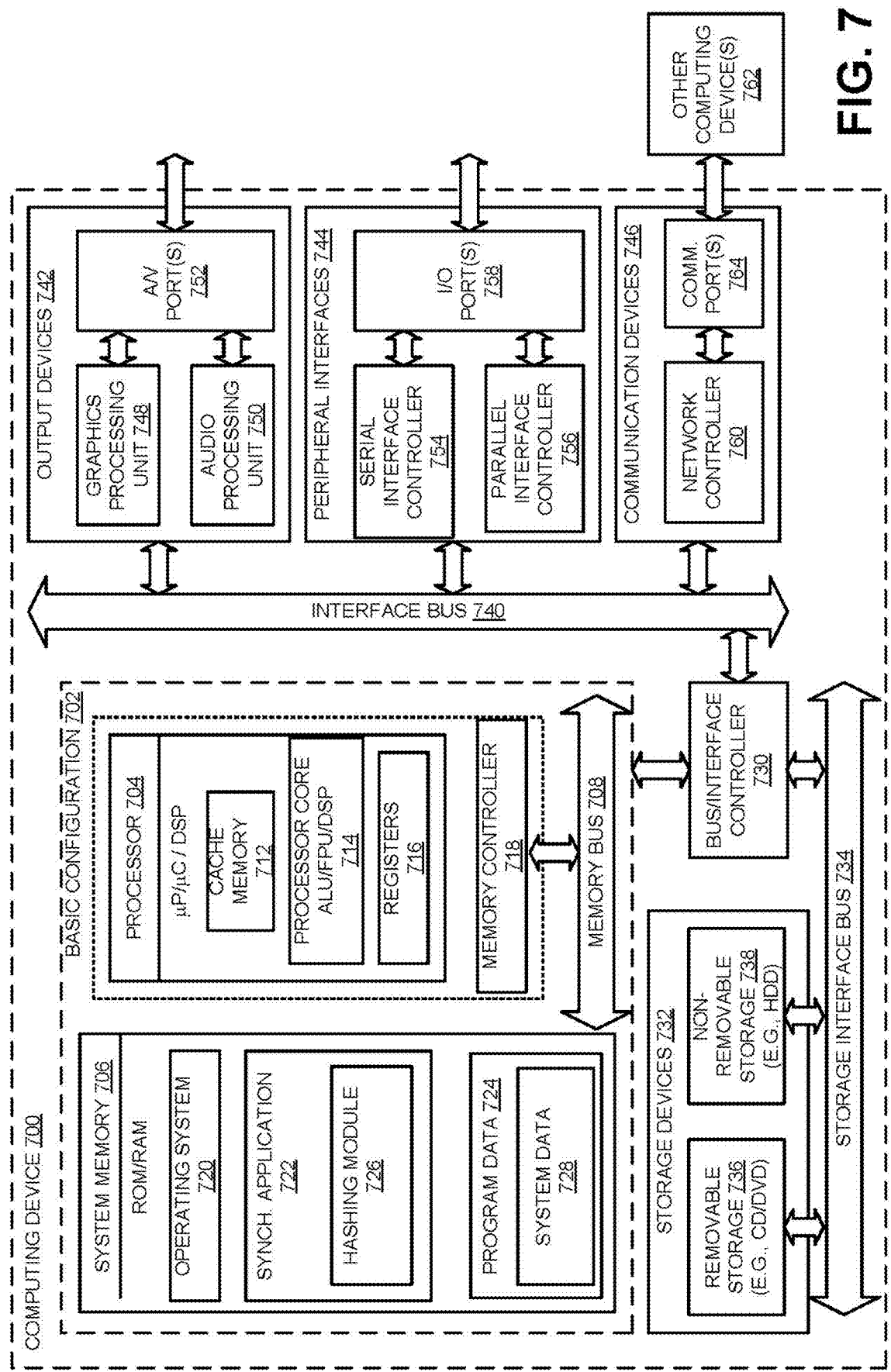
FIG. 7 is a block diagram of an example general purpose computing device, which may be used to employ device-specific chunked hash size timing.

FIG. 7 is a block diagram of an example general purpose computing device, which may be used to employ device-specific chunked hash size tuning to maximize synchronization throughput.

For example, computing device 700 may be used as desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor ($\mu P$), a microcontroller ($\mu C$), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a synchronization application 722, and program data 724. The synchronization application 722 may include a hashing module 726, which may be an integrated module of the synchronization application 722. The synchronization application 722 and/or the hashing module 726 may be configured to determine size of hash buffer for file comparisons by baselining throughput of hashing on the computing device and finding the number of bytes hashed in a given amount of time. The number of bytes may then be used as the hash block size. The program data 724 may include, among other data, system data 728, such as the hardware information that may result in a change to the hash chunk size, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to employ device-specific chunked hash size tuning to maximize synchronization throughput. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
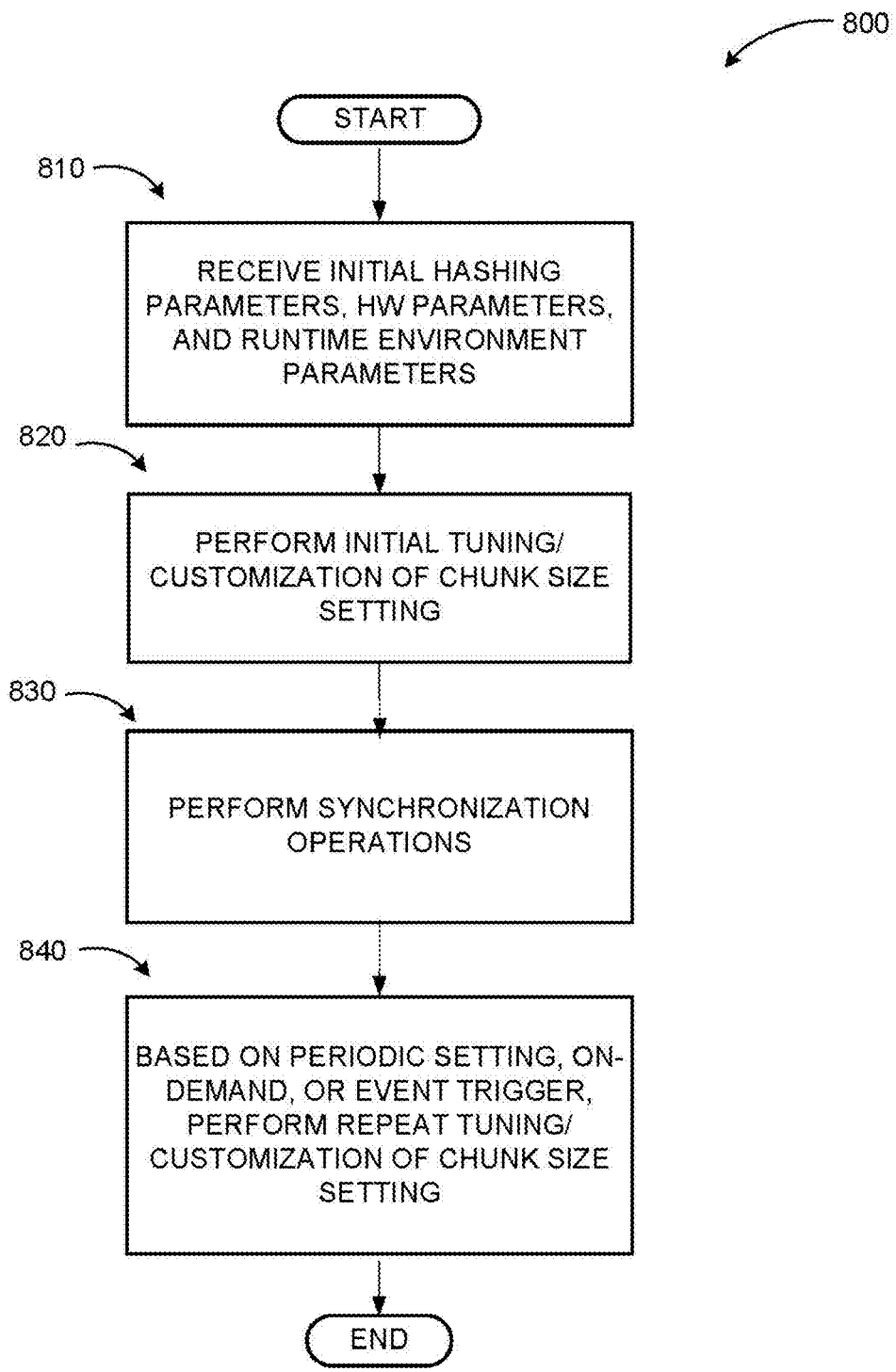
FIG. 8 illustrates a logic flow diagram of a method to provide device-specific chunked hash size tuning.

FIG. 8 illustrates a logic flow diagram of a method to provide device-specific chunked hash-size tuning.

Process 800 may be implemented on a computing device, server, or other system. An example system may include a client device comprising a communication interface to facilitate communication between the client device and a storage service server, a memory, and one or more processors. The processors may be configured to, in conjunction with the memory, execute a synchronization module of a storage service client application provided to enable synchronization of remotely stored files with local storage.

Process 800 begins with operation 810, where the client application or its hashing module may receive initial hashing parameters such as hardware environment information (processor capacity, memory information, etc.) and operating system parameters such as memory allocation, processing queues, etc. At operation 820, an initial tuning or customization may be performed to determine an optimal chunk size for the computing device in synchronization operations. In some examples, the initial chunk size information may be dictated by the cloud based storage service.

At operation 830, the client application may perform synchronization operations synchronizing files whose content have changed employing device-specific chunked hash size to maximize synchronization throughput. At operation 840, the tuning/customization operations may be repeated based detection of changes to the hardware or operating system parameters, a periodic re-tune requirement, or on-demand (e.g., user requesting repeat of tuning). The re-tuned chunk size may be used in hashing for further synchronization operations following the re-tune step.

The operations included in process 800 are for illustration purposes. Device-specific chunked hash size tuning to maximize synchronization throughput may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for employing device-specific chunked hash size tuning is described. The means may include a means for receiving one or more of a hashing parameter, a hardware parameter associated with the computing device, or a runtime parameter associated with the computing device; a means for performing an initial tuning operation to determine a hashing chunk size to be used in remote storage synchronization operations; a means for performing the remote storage synchronization operations using the determined initial hashing chunk size; a means for detecting a trigger event for a re-tuning operation; and a means for performing the re-tuning operation to determine a new hashing chunk size to be used in subsequent remote storage synchronization operations.

According to some examples, a method executed on a computing device to employ device-specific chunked hash size tuning is described. The method may include receiving one or more of a hashing parameter, a hardware parameter associated with the computing device, or a runtime parameter associated with the computing device; performing an initial tuning operation to determine a hashing chunk size to be used in remote storage synchronization operations; performing the remote storage synchronization operations using the determined initial flashing chunk size; detecting a trigger event for a re-tuning operation; and performing the re-tuning operation to determine a new hashing chunk size to be used in subsequent remote storage synchronization operations.

According to other examples, the method may also include performing the subsequent remote storage synchronization operations using the new hashing chunk size. Detecting the trigger event for the re-tuning operation may include detecting one or more of an expiration of a predefined period, a change in at least one of a hardware environment or a runtime environment of the computing device, or a request from a user associated with the computing device. The change in the hardware environment may include detecting a hardware degradation or a hardware upgrade. The change in the runtime environment may include detecting one or more of a hardware configuration change controlled by the operating system, an operating system update, a device driver change or update, a third-party software change or update, or a system service change.

According to further examples, receiving the hashing parameter may include receiving a default hashing chunk size from a remote storage service. The method may further include performing the initial tuning operation at one of an installation of a synchronization client application, a start-up of the synchronization client application, or a remote storage service account activation. Performing the initial tuning operation may include determining a number of bytes that can be hashed in a predefined period of time based on a hardware environment and a runtime environment of the computing device. The method may also include setting a test buffer with a predefined set of byte values or a randomly generated set of byte values. The method may further include creating a largest sized static buffer within the computing device hardware and operating system environment; hashing the buffer until entire contents of the buffer are hashed or the predefined period of time is reached; and if the hashing completes before the predefined period of time is reached, setting the hashing chunk size to the static buffer size; else computing a scaled hashing chunk size value based on number of bytes that were hashed prior to the predefined period of time being reached. The method may include creating a static buffer based on a lowest common denominator; repeatedly hashing the buffer until the predefined period of time expires; and determining a number of full buffers that have been hashed during the predefined period of time and multiplying by a size of the buffer to determine the hashing chunk size.

According to other examples, a client device to employ device-specific chunked hash size tuning is described. The client device may include a display; a communication interface configured to facilitate communication between the client device and a storage service; a memory configured to store instructions; and one or more processors coupled to the memory. The one or more processors, in conjunction with the instructions stored in the memory, may be configured to receive one or more of a hashing parameter, a hardware parameter associated with the client device, or a runtime parameter associated with the client device; perform an initial tuning operation to determine a hashing chunk size to be used in storage related operations; perform the storage related operations using the determined initial hashing chunk size; detect one or more of an expiration of a predefined period, a change in at least one of a hardware environment or a runtime environment of the client device, or a request from a user associated with the client device; perform the re-tuning operation to determine a new hashing chunk size to be used in subsequent storage related operations; and perform the subsequent storage related operations using the new hashing chunk size.

According to some examples, the storage related operations may include remote storage synchronization, file backup, file deduplication, or file integrity confirmation. The one or more processors may be further configured to present an option to configure the client device as a master device among multiple client devices of the user; and set hashing chunk size for remaining client devices of the user based on the determined hashing chunk size. The hardware parameter may include an overall processor capacity, an available processor capacity, an overall memory, or an available memory, and the runtime parameter may include a memory usage configuration or a processor queue configuration.

According to further examples, a method executed on a computing device to employ device-specific chunked hash size tuning is described. The method may include performing an initial tuning operation to determine a hashing chunk size, where the initial tuning operation comprises a testing of hashing employed at the computing device; performing a file operation comprising one or more of remote storage synchronization, file backup, file deduplication, or file integrity confirmation using the determined initial hashing chunk size; detecting one or more of an expiration of a predefined period, a change in at least one of a hardware environment or a runtime environment of the computing device, or a request from a user associated with the computing device; and performing the re-tuning operation to determine a new hashing chunk size to be used in subsequent file operations.

According to yet other examples, the testing of the hashing employed at the computing device may include hashing a first static buffer until entire contents of the buffer are hashed or a predefined period of time is reached; and repeatedly hashing a second static buffer created based on a lowest common denominator until the predefined period of time expires hashing a plurality of static buffers of distinct sizes until one of the buffers is determined to hash within the predefined period of time; or performing a binary search in hashing the plurality of static buffers of distinct sizes until a best fit between a hash time of one of the buffers and the predefined period of time is determined. The testing of the hashing employed at the computing device may also include continuously feeding bytes info an employed hash algorithm until a predefined period of time expires; and using a total number of bytes hashed within the predefined period of time as the hashing chunk size. The method may further include upon determination of the hashing chunk size, aligning the hashing chunk size to an employed file system segment size.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to employ device-specific chunked hash size tuning, the method comprising:

receiving at least one parameter selected from the group consisting of a hashing parameter, a hardware parameter associated with the computing device, and a runtime parameter associated with the computing device;

performing an initial tuning operation based on the at least one parameter to set a hashing chunk size to be used in remote storage synchronization operations;
performing the remote storage synchronization operations using the initial hashing chunk size;
detecting a trigger event for a re-tuning operation; and
performing the re-tuning operation to set a new hashing chunk size to be used in subsequent remote storage synchronization operations,
wherein detecting a trigger event includes detecting at least one selected from the group consisting of an expiration of a predefined period, a change in at least one of a hardware environment or a runtime environment of the computing device, or a request from a user associated with the computing device.

2. The method of claim 1, further comprising:
performing the subsequent remote storage synchronization operations using the new hashing chunk size.

3. The method of claim 1, wherein the change in the hardware environment comprises:
detecting a hardware degradation or a hardware upgrade.

4. The method of claim 1, wherein the change in the runtime environment comprises:
detecting one or more of a hardware configuration change controlled by the operating system, an operating system update, a device driver change or update, a third-party software change or update, or a system service change.

5. The method of claim 1, wherein receiving the hashing parameter comprises:
receiving a default hashing chunk size from a remote storage service.

6. The method of claim 1, further comprising:
performing the initial tuning operation at one of an installation of a synchronization client application, a start-up of the synchronization client application, or a remote storage service account activation.

7. The method of claim 1, wherein performing the initial tuning operation comprises:
determining a number of bytes to be hashed in a predefined period of time based on a hardware environment and a runtime environment of the computing device.

8. The method of claim 7, further comprising:
setting a test buffer with a predefined set of byte values or a randomly generated set of byte values.

9. The method of claim 8, further comprising:
creating a largest sized static buffer within the computing device hardware and operating system environments;
hashing the buffer until entire contents of the buffer are hashed or the predefined period of time is reached; and
if the hashing completes before the predefined period of time is reached, setting the hashing chunk size to the static buffer size; else
computing a scaled hashing chunk size value based on number of bytes that were hashed prior to the predefined period of time being reached.

10. The method of claim 8, further comprising:
creating a static buffer based on a lowest common denominator;
repeatedly hashing the buffer until the predefined period of time expires; and
determining a number of full buffers that have been hashed during the predefined period of time and multiplying by a size of the buffer to set the hashing chunk size.

11. A client device to employ device-specific chunked hash size tuning, the client device comprising:
a display;
a communication interface configured to facilitate communication between the client device and a storage service;
a memory configured to store instructions; and
one or more processors coupled to the memory, wherein the one or more processors, in conjunction with the instructions stored in the memory, are configured to:
receive at least one parameter selected from the group consisting of a hashing parameter, a hardware parameter associated with the client device, and a runtime parameter associated with the client device;
perform an initial tuning operation based on the at least one parameter to set a hashing chunk size to be used in storage related operations;
perform the storage related operations using the initial hashing chunk size;
detect one or more of an expiration of a predefined period, a change in at least one of a hardware environment or a runtime environment of the client device, or a request from a user associated with the client device;
perform the re-tuning operation to set a new hashing chunk size to be used in subsequent storage related operations; and
perform the subsequent storage related operations using the new hashing chunk size.

12. The client device of claim 11, wherein the storage related operations include remote storage synchronization, file backup, file deduplication, or file integrity confirmation.

13. The client device of claim 11, wherein the one or more processors are configured to:
present an option to configure the client device as a master device among multiple client devices of the user; and
set hashing chunk size for remaining client devices of the user based on the hashing chunk size.

14. The client device of claim 11, wherein the hardware parameter includes an overall processor capacity, an available processor capacity, an overall memory, or an available memory, and wherein the runtime parameter includes a memory usage configuration or a processor queue configuration.

15. A method executed on a computing device to employ device-specific chunked hash size tuning, the method comprising:
performing an initial tuning operation to set a hashing chunk size, wherein the initial tuning operation comprises a testing of hashing employed at the computing device;
performing a file including at least one selected from the group consisting of remote storage synchronization, file backup, file deduplication, and file integrity confirmation using the initial hashing chunk size;
detecting at least one selected from the group consisting of an expiration of a predefined period, a change in at least one of a hardware environment or a runtime environment of the computing device, and a request from a user associated with the computing device; and
performing the re-tuning operation to determine a new hashing chunk size to be used in subsequent file operations.

16. The method of claim 15, wherein the testing of the hashing employed at the computing device comprises one of:
hashing a first static buffer until entire contents of the buffer are hashed or a predefined period of time is reached; and repeatedly hashing a second static buffer created based on a lowest common denominator until the predefined period of time expires.

17. The method of claim 15, wherein the testing of the hashing employed at the computing device comprises one of:
hashing a plurality of static buffers of distinct sizes until one of the buffers is determined to hash within a predefined period of time; and
performing a binary search in hashing the plurality of static buffers of distinct sizes until a best fit between a hash time of one of the buffers and the predefined period of time is determined.

18. The method of claim 15, wherein the testing of the hashing employed at the computing device comprises:
continuously feeding bytes into an employed hash algorithm until a predefined period of time expires; and
using a total number of bytes hashed within the predefined period of time as the hashing chunk size.

19. The method of claim 15, further comprising:
upon determination of the hashing chunk size, aligning the hashing chunk size to an employed file system segment size.

* * * * *